United States Patent [19]
Sabatino et al.

[11] Patent Number: 5,765,818
[45] Date of Patent: Jun. 16, 1998

[54] VIBRATION DAMPING STRUCTURE FOR USE WITH A MACHINE TOOL

[76] Inventors: David B. Sabatino, 250 N. California, Mundelein, Ill. 60060; Alan T. Hughes, 1132 N. Lancaster Cir., South Elgin, Ill. 60177

[21] Appl. No.: 683,661

[22] Filed: Jul. 17, 1996

[51] Int. Cl.$^6$ ............................................. F16M 3/00
[52] U.S. Cl. .......................... 267/137; 188/268; 248/559; 52/251; 52/167.1; 403/265; 267/80; 267/182; 267/73
[58] Field of Search ...................... 267/136, 137, 267/81, 73, 83, 80, 182; 188/268; 83/796, 701, 859; 248/559, 679; 403/265, 267, 269; 181/211; 52/251, 252, 404.1, 794.1, 167.1, 167.3; 14/73.5; 249/150

[56] References Cited

U.S. PATENT DOCUMENTS

| | | |
|---|---|---|
| 4,187,573 | 2/1980 | Fyfe et al. ........................ 52/167.1 X |
| 4,557,171 | 12/1985 | Stolzer ............................... 83/796 |
| 4,691,488 | 9/1987 | Tomma ............................. 248/559 |
| 5,542,508 | 8/1996 | Van Erden et al. ............... 188/268 X |

*Primary Examiner*—Robert J. Oberleitner
*Assistant Examiner*—Pamela J. Lipka
*Attorney, Agent, or Firm*—Meroni & Meroni

[57] ABSTRACT

A vibration damping structure for a machine tool is provided. The structure includes first and second plate members disposed in an opposing spaced apart relationship with one another. A cast structure formed of a polymer concrete extends between the first and second plate members. A first structure is attached to the first plate member and extends inwardly of the cast structure. The first structure has a compression surface extending in a spaced apart relationship from the surface of the first plate member. A second structure is attached to the second plate member and extends inwardly of the cast structure. The second structure has a compression surface extending in a spaced apart relationship from the surface of the second plate member and in an opposed spaced apart interlocking relationship with the compression surface of the first structure so that tensile forces applied to the first and second plate members will correspondingly produce compression forces between the opposing compression surfaces and the damping material therebetween.

26 Claims, 10 Drawing Sheets

VIBRATION DAMPING STRUCTURE FOR USE WITH A MACHINE TOOL

BACKGROUND OF THE INVENTION

1. Field of the Invention

The present invention relates generally to vibration damping structures. More particularly, the invention pertains to a vibration damping structure optimized for maximum rigidity when multi-directional loads are applied as when used in a machine tool.

2. Description of the Prior Art

In operation, machine tools and other similar manufacturing equipment or systems are subject to numerous vibration problems. Vibration leads to shorter tool life, poorer surface finish on the work produced, and lower output.

To attenuate such vibrations, prior art machine tools typically employ the use of cast iron structures. While cast iron structures offer high rigidity and do serve to provide damping characteristics, they do not offer a complete solution to the complex and numerous vibration problems encountered.

In more recent years, polymer concrete has been found to provide improved damping over conventional materials. For example, polymer concrete can provide approximately five times more effective damping over cast iron structures. However, while polymer concrete has high compressive strength, it contains low tensile strength which would diminish its applicability for solving machine tool vibration problems which requires a damping structure to have high rigidity and stiffness to absorb the multi-directional loads and forces employed by a machine tool.

As will be described in greater detail hereinafter, the structure of the present invention solves this problem to provide a structure having improved damping properties and high rigidity for use in machine tool applications. The present invention differs from those previously proposed and employs a number of novel features that render it highly advantageous over the prior art.

SUMMARY OF THE INVENTION

Accordingly, it is an object of this invention to provide a vibration damping structure having improved damping characteristics over prior art structures.

Another object of this invention is to provide a vibration damping structure having the necessary rigidity for withstanding the multi-directional loads and forces created by machine tools.

Still another object of this invention is to provide a vibration damping structure that eliminates any metal to metal contact which would provide a path for vibration transmission.

Yet another object of this invention is to provide a vibration damping structure that isolates the vibration as close to the source as possible and utilizes the theory of dissimilar materials.

To achieve the foregoing and other objectives, and in accordance with the purposes of the present invention a vibration damping structure is provided. The structure includes first and second plate members disposed in an opposing spaced apart relationship with one another. A cast structure formed of a damping material extends between the first and second plate members. A first structures is attached to the first plate member and extends inwardly of the cast structure. The first structure has a compression surface extending in a spaced apart relationship from the surface of the first plate member. A second structure is attached to the second plate member and extends inwardly of the cast structure. The second structure has a compression surface extending in a spaced apart relationship from the surface of the second plate member and in an opposed spaced apart interlocking relationship with the compression surface of the first structure so that tensile forces applied to the first and second plate members will correspondingly produce compression forces between the opposing compression surfaces and the damping material therebetween.

In accordance with an aspect of the invention, the damping material is comprised of a castable polymer concrete.

In accordance with an another aspect of the invention, the structure is mounted to a machine tool with an outer surface of the first plate member extending in a generally horizontal plane. The outer surface being sized and configured for mounting a rotary table of the machine tool thereupon.

In accordance with yet another aspect of the invention, the cast structure and first and second plate members have a spindle aperture extending perpendicularly therethough. The aperture is adapted for receiving a spindle of a machine tool. The spindle has a mating surface attachable to the first plate member. A spindle housing is attached to and extends rearwardly from a back side of the second plate member. The spindle housing has an annular wall to define a chamber sized and configured for receiving the spindle therewithin. A damping structure is provided in the spindle housing for confronting engagement with the spindle.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
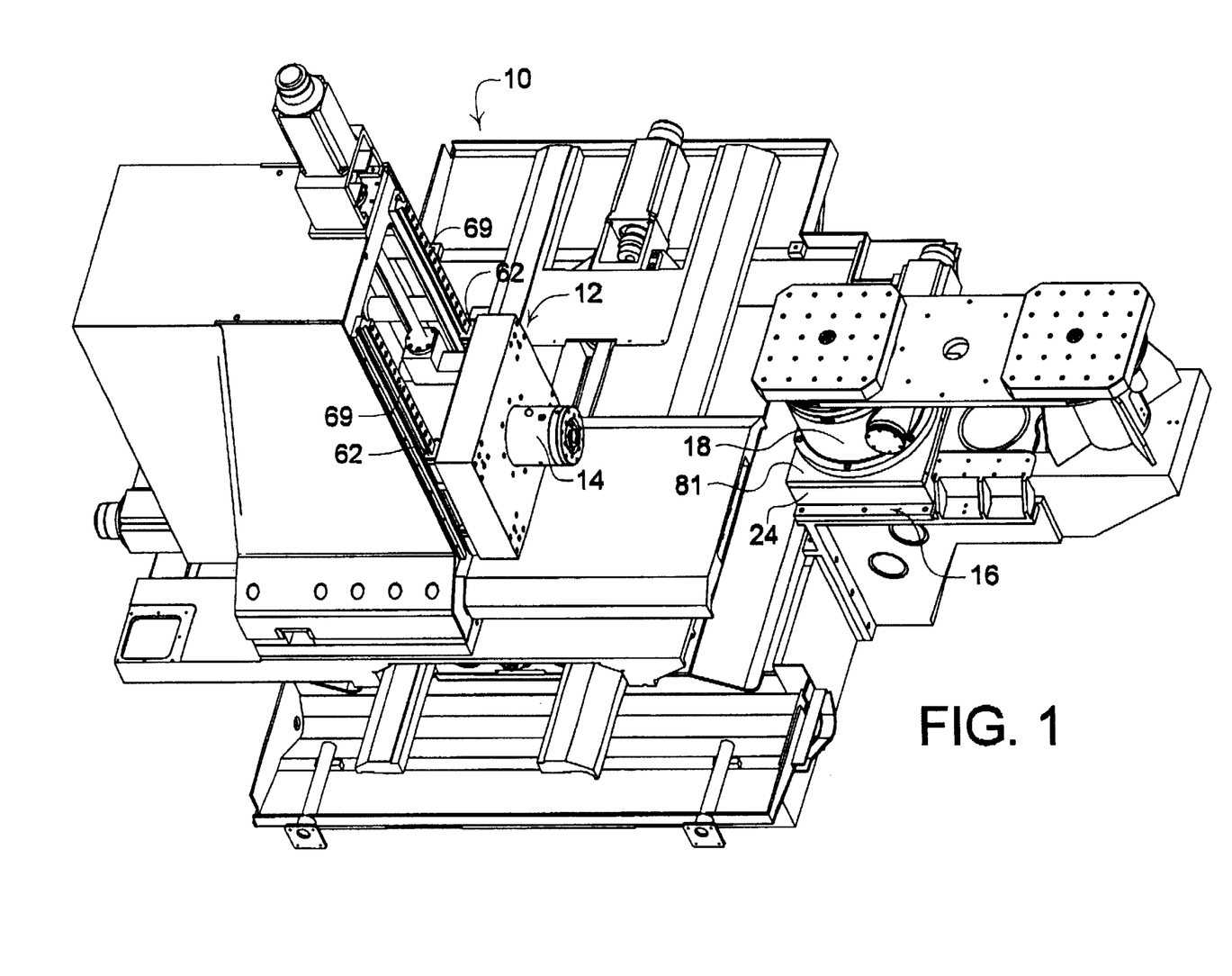
FIG. 1 is a perspective view of the present invention mounted for use with a machine tool.
Figure 2:
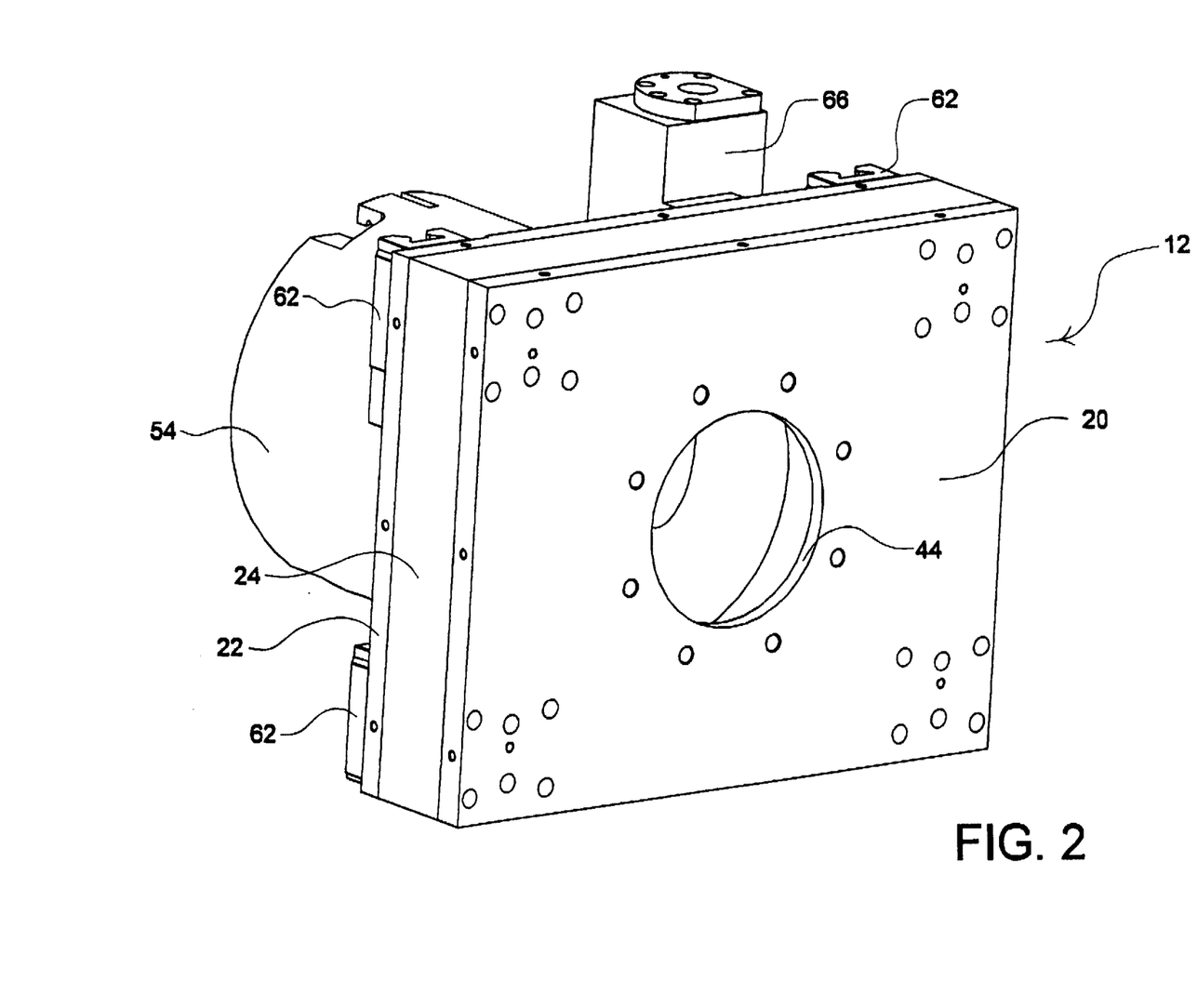
FIG. 2 is a perspective view of a first embodiment of the present invention.

Referring now to the drawings, a machine tool 10 is illustrated in FIG. 1 which employs a vibration damping structure 12 of a first embodiment for use with a spindle 14 of the machine tool 10 and a vibration damping structure 16 of a second embodiment for use with a rotary table 18 of the machine tool 10.

In the preferred embodiments illustrated in FIG. 1, the machine tool 10 is a horizontal machining center. It should be understood that the features of the vibration damping structures 12, 16 can be employed with other machine tools, such as grinders and lathes, and other equipment requiring similar vibration damping.

Referring to FIGS. 2–4 and 9, the structures 12, 16 each have a first plate member 20 and a second plate member 22 disposed in an opposing spaced apart relationship with one another. The first and second plate members 20, 22 are preferably formed of steel and extend in planes generally parallel to one another.

A cast structure 24 formed of castable damping material or polymer concrete extends between the first and second plate members 20, 22 in confronting engagement with opposed surfaces 26, 27 of the first and second plate members 20, 22. Preferably, the polymer concrete is produced by ITW Philadelphia Resins of Montgomeryville, Pa. under the trademark SUPER ALLOY HI-TECH POLYMER CONCRETE and has a compressive strength of 1,406 kg/cm$^2$, a tensile strength of 141 kg/cm$^2$ and vibration damping approximately eight times better than granite.

Figure 3:
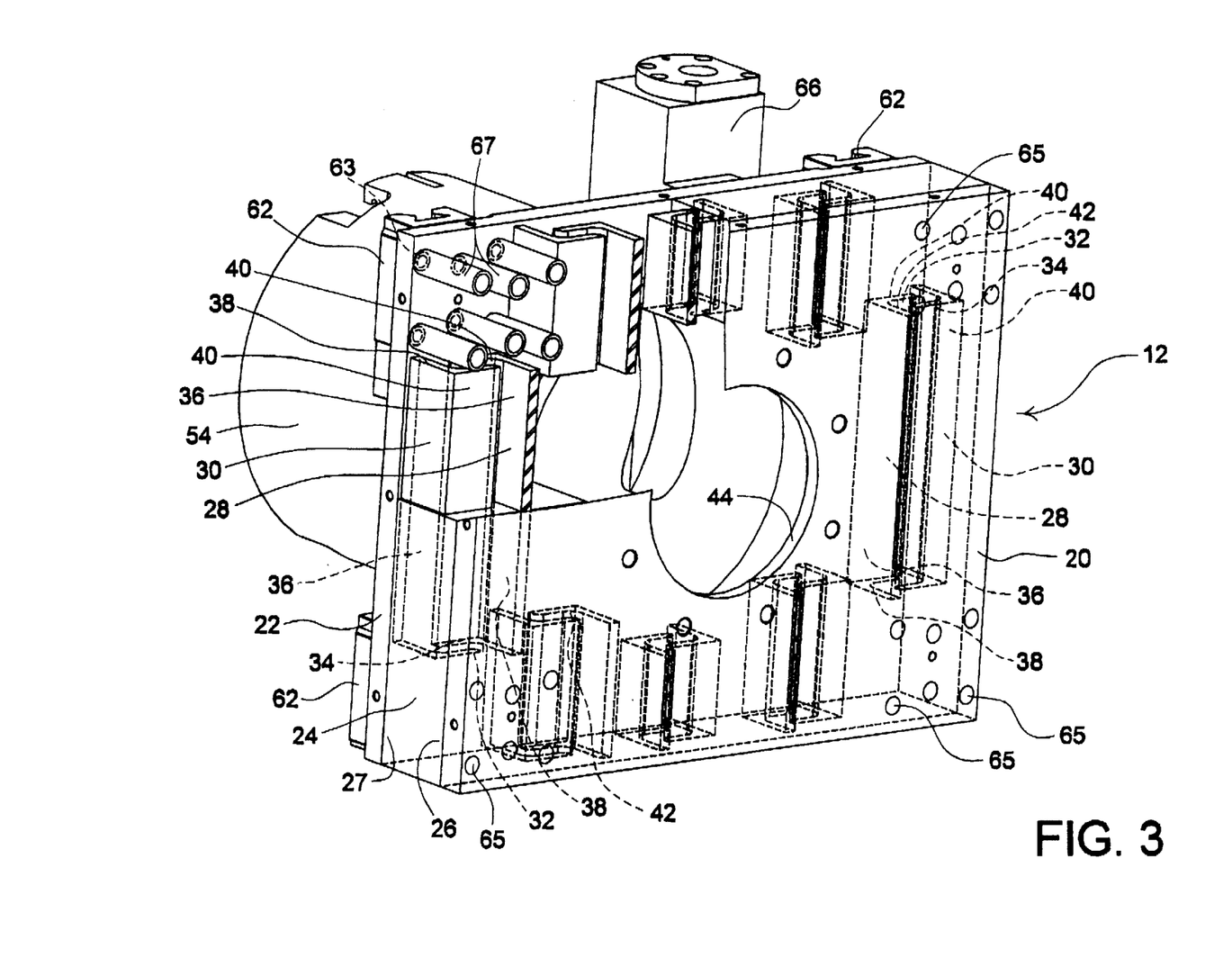
FIG. 3 is a partially sectional perspective view of FIG. 2.
Figure 9:
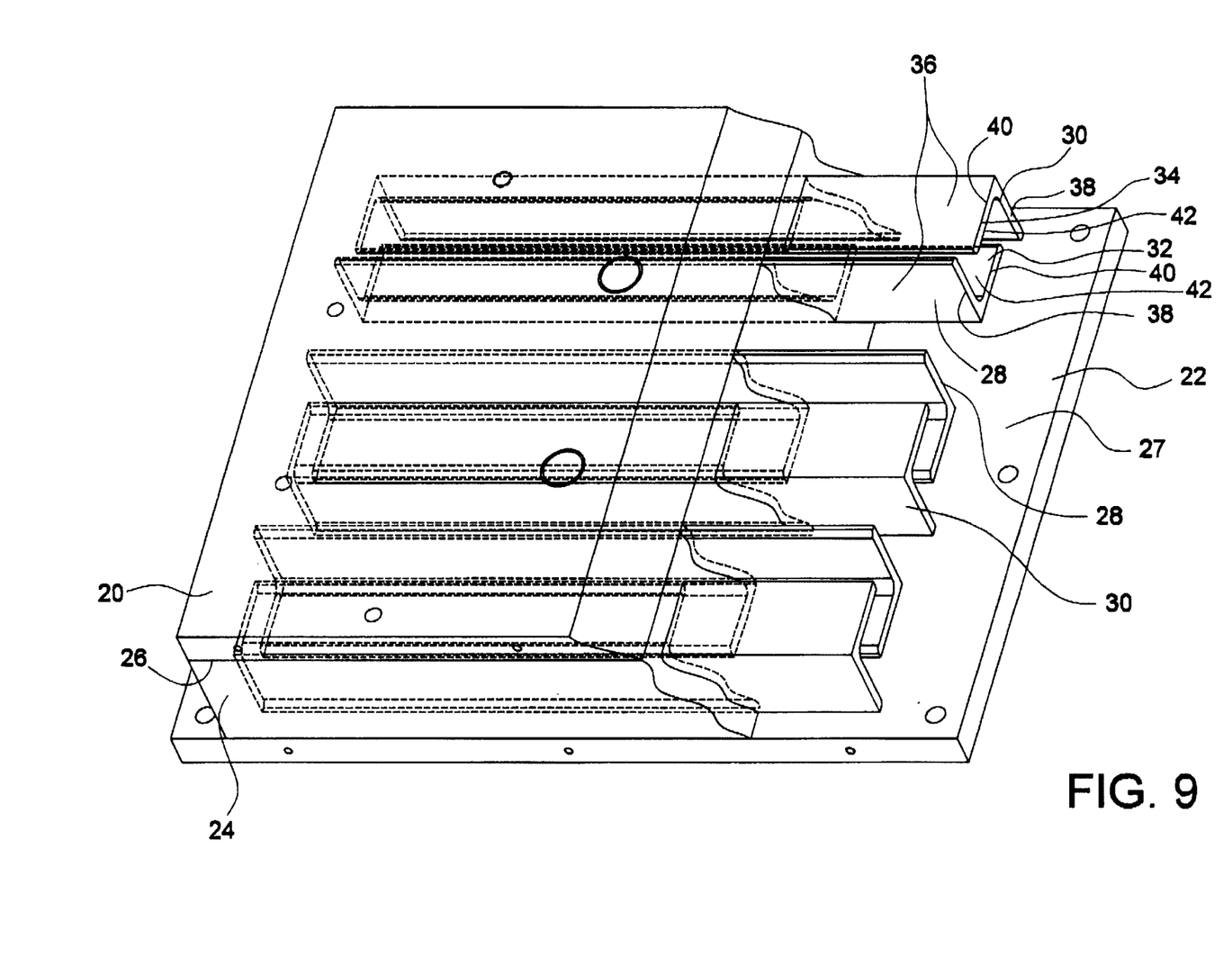
FIG. 9 is a partially sectional perspective view of the second embodiment.

Referring to FIGS. 3 and 9, first and second structures 28, 30 are provided for transferring tensile forces applied to the cast structure 24 from the first and second plate members 20, 22 into compression forces applied to the cast structure 24. Where a large percentage of multi-directional loads applied to structure 12 will have some component or vector extending in the direction perpendicular to the structure 12, such loads will involve compression or tensile strength of the structure 12. Hence, to produce a structure 12 usable for a machine tool, the structure 12 must have maximum rigidity in both compression and tensile categories.

Each first structure 28 is attached to the first plate member 20 and extends inwardly of the cast structure 24. Each first structure 28 has a compression surface 32 extending in a spaced apart parallel relationship from the surface 26 of the first plate member 20. Each second structure 30 is attached to the second plate member 22 and extends inwardly of the cast structure 24. Each second structure 30 has a compression surface 34 extending in a spaced apart parallel relationship from the surface 27 of the second plate member 22 and in an opposed overlapping spaced apart relationship with the compression surface 32 of the first structure 28.

In a preferred embodiment, the first and second structures 28, 30 are L-shaped angle irons 36 welded to corresponding first and second plate members 20, 22. Each L-shaped angle iron 36 has a first member 38 attached perpendicular to the respective surfaces 26, 27 of the first and second plate members 20, 22. Each L-shaped angle iron 36 has a second member 40 extending transversely from the first member 38 in a parallel spaced apart relationship with the respective surfaces 26, 27 of the first and second plate members 20, 22. Each corresponding compression surface 32, 34 of the first and second structures 28, 30 are disposed on an inner surface 42 of a respective second member 40. The first and second structures 28, 30 are attached to respective first and second plate members 20, 22 with first members 38 of each first and second structure 28, 30 extending substantially parallel to one another which further allows for transferring tensile forces applied perpendicular to the first members 28 into compression forces between opposing first members upon the polymer concrete therebetween. In construction, the first and second plate members 20, 22 with the attached irons 36 are placed in a mold for the polymer concrete to be poured and filled therewithin until it is properly cured.

Figure 4:
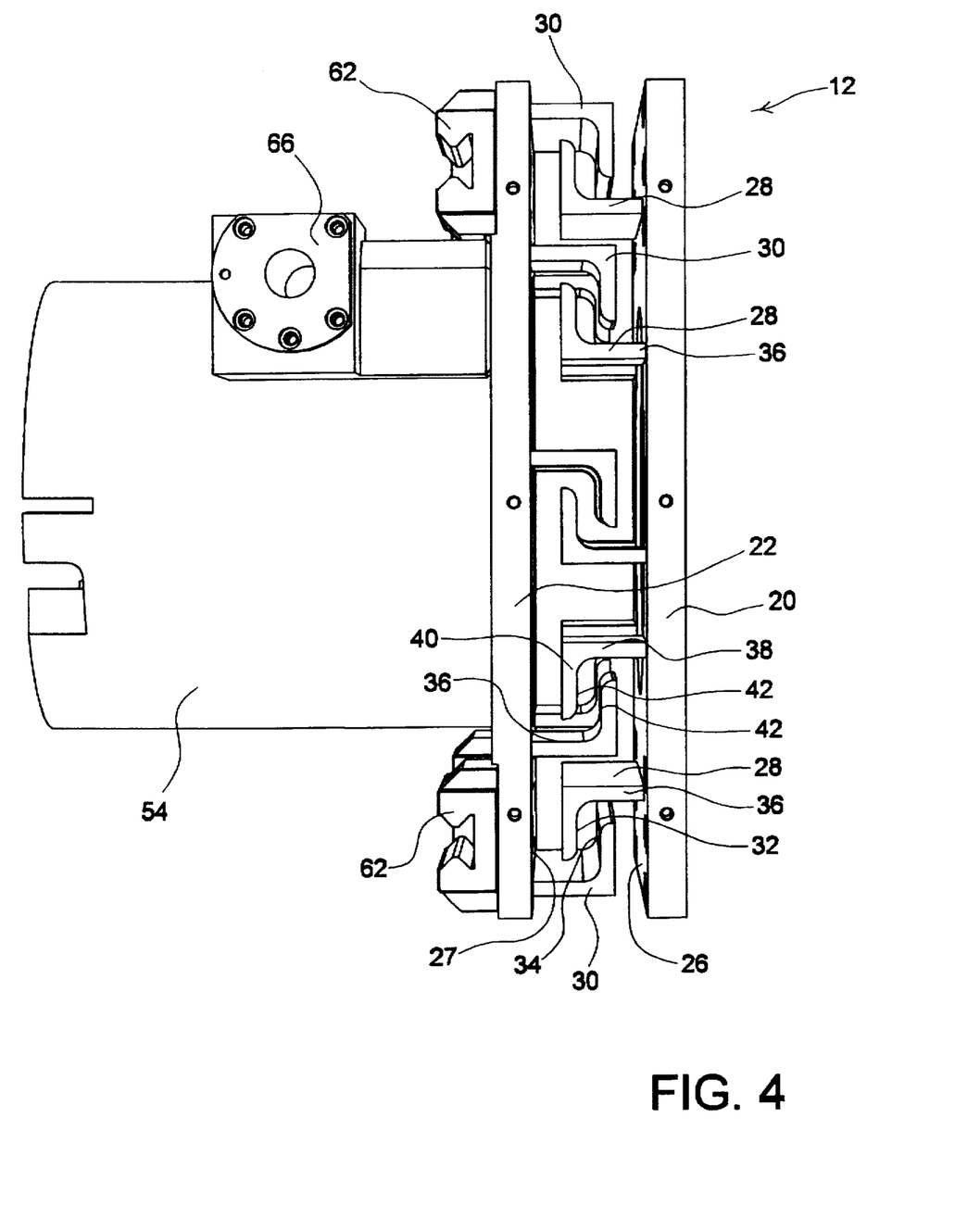
FIG. 4 is a side view of the first embodiment having the cast structure removed to show further detail.
Figure 10:
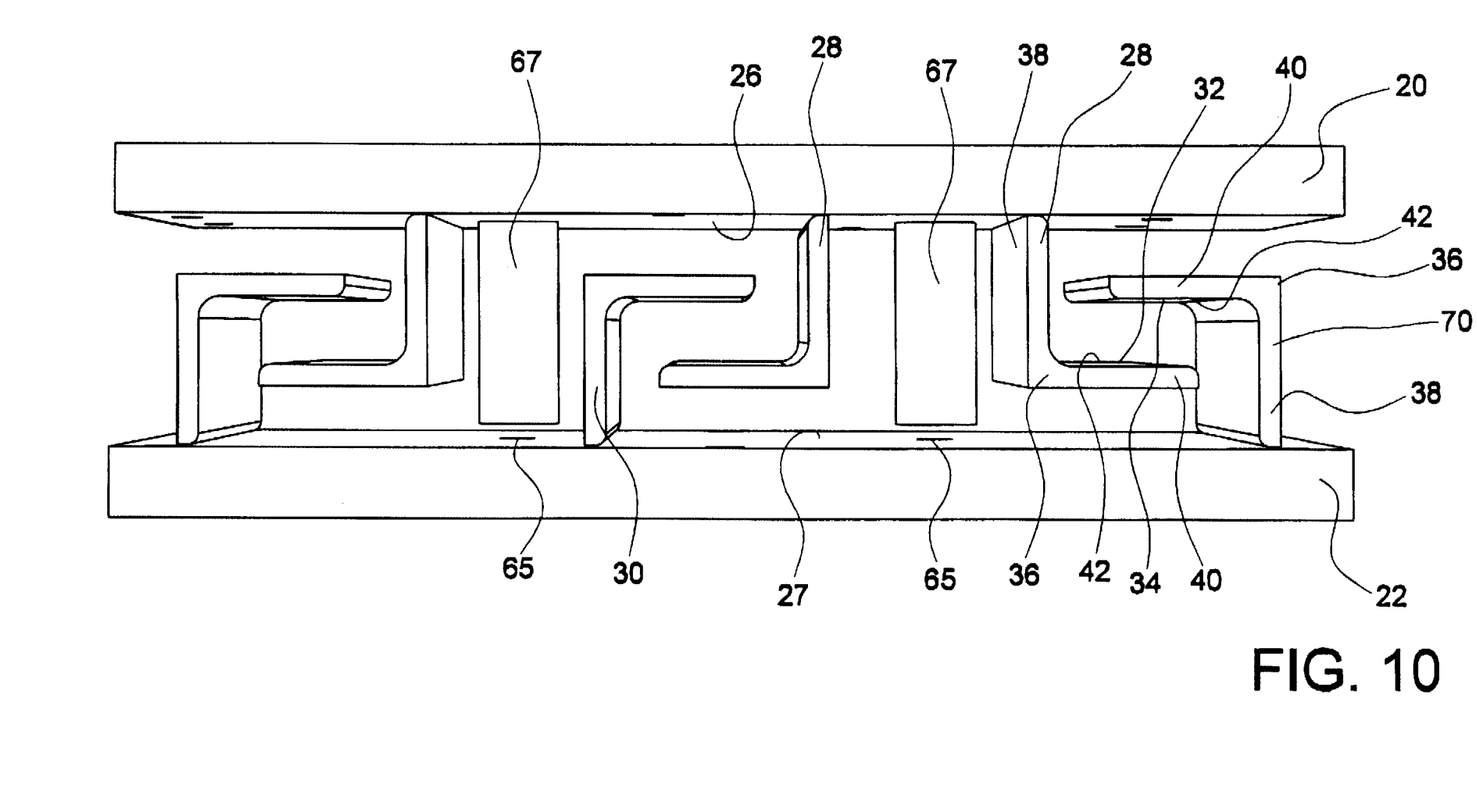
FIG. 10 is a side view of the second embodiment.

It should be understood that other arrangements or configurations of the first and seconds structures 28, 30 could be produced. As best illustrated in FIGS. 4 and 10, the first and second structures 28, 30 are oriented and embedded in the polymer concrete but at all the time remaining separated from one another to prevent the transfer of vibration between metal to metal contact.

Figure 5:
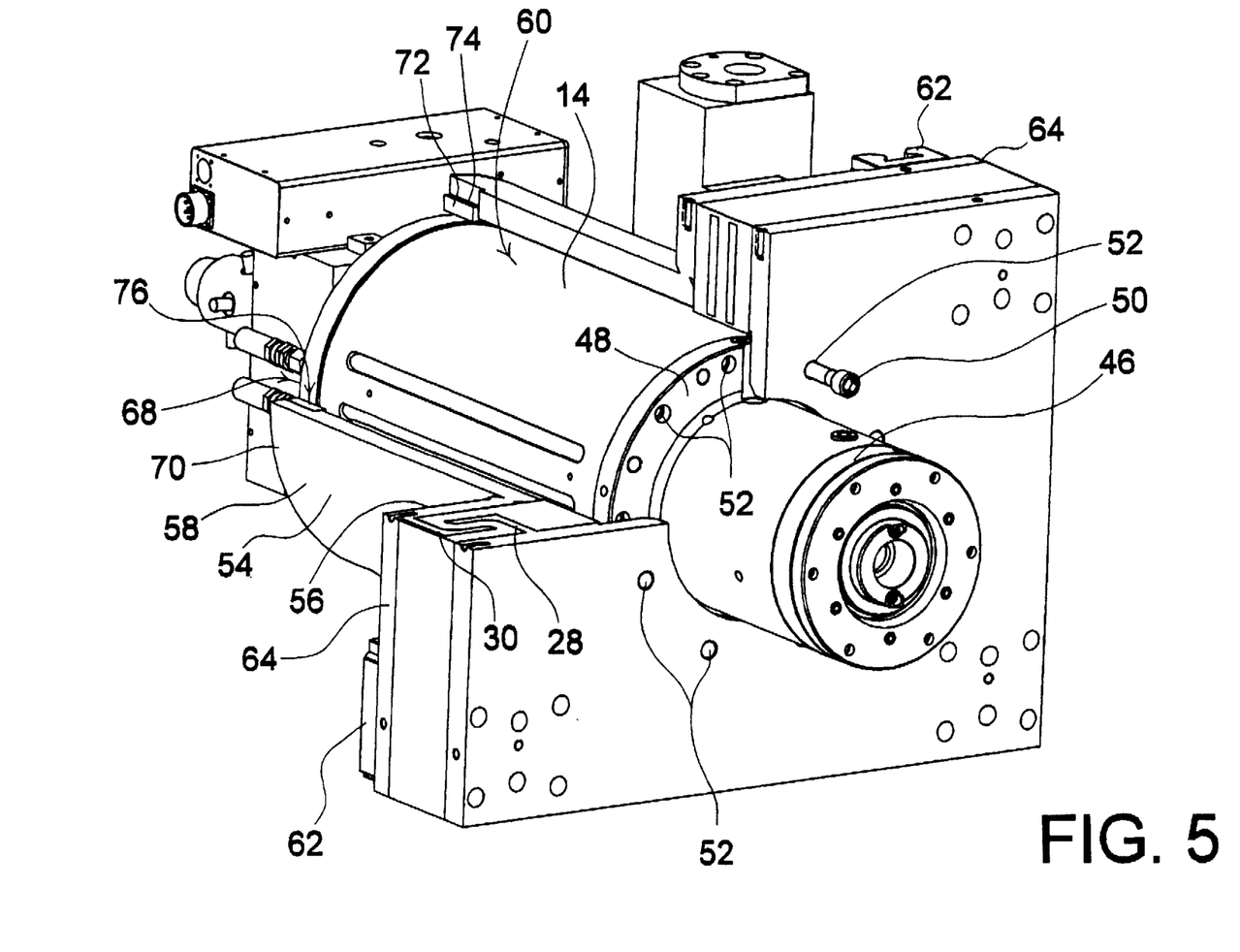
FIG. 5 is a partially sectional perspective view of the first embodiment for use with a spindle of the machine.
Figure 6:
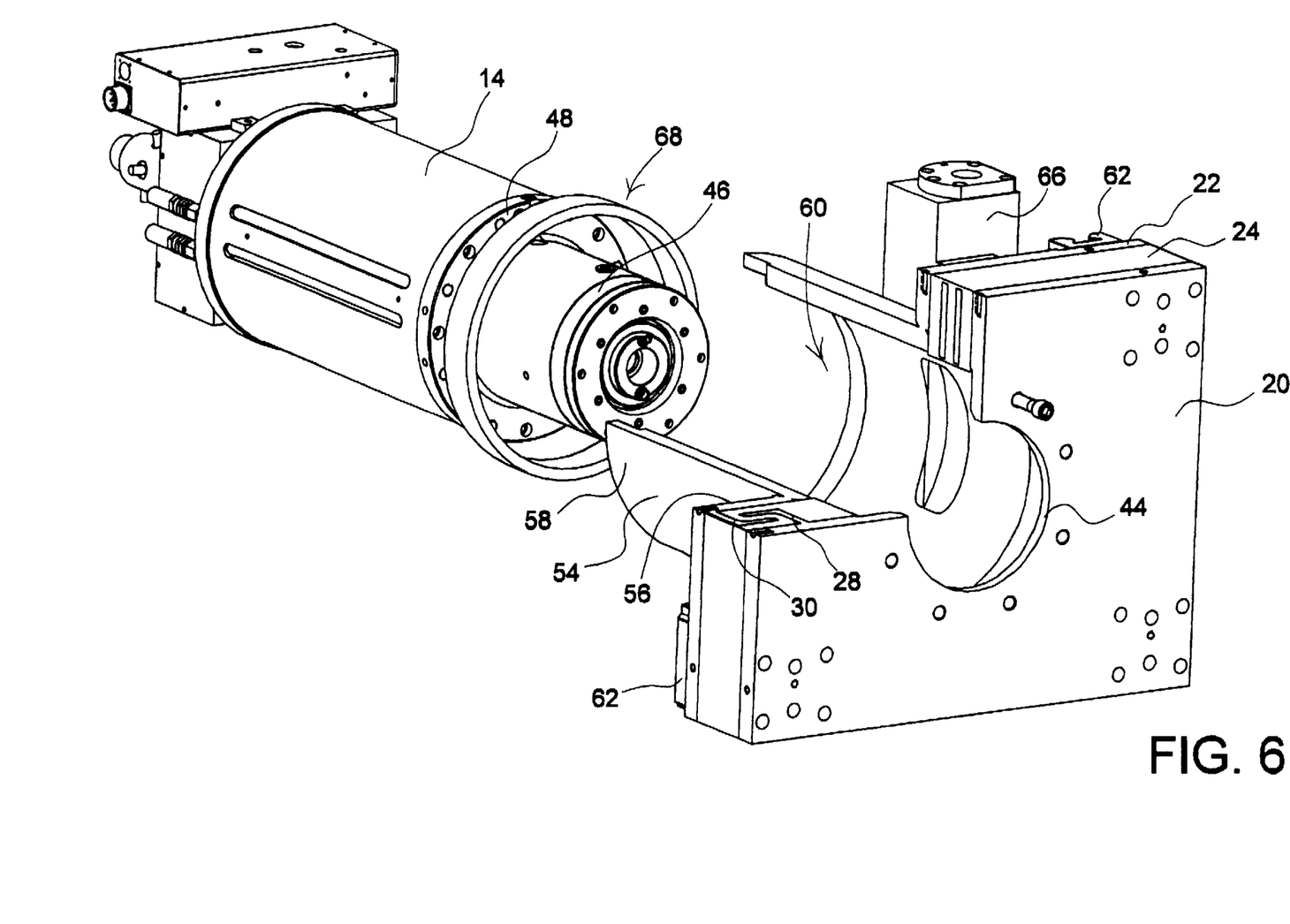
FIG. 6 is an exploded partially sectional perspective view of FIG. 5.

Referring now more particularly to the structure 12 of the first embodiment shown in FIGS. 2–6, the cast structure 24 and first and second plate members 20, 22 have a spindle aperture 44 extending perpendicularly therethough. The aperture 44 is adapted for receiving the spindle 14 with a spindle nose 46 of the spindle 14 extending outwardly from the first plate member, as best illustrated in FIG. 5. The spindle 14 has a circular vertically disposed mating surface or flange 48 attachable to the first plate member 20 with bolts 50 that extend through bolt holes 52 on the mating surface 48 and first plate member 20.

A metal spindle housing 54 is attached to and extends rearwardly from a back side 56 of the second plate member 22. The spindle housing 54 has an annular wall 58 which defines a chamber 60 that is sized and configured for receiving the spindle 14. Carriage assemblies 62 of known design are secured along opposite edges 64 of the back side 56 of the second plate member 22 with bolts 63. To gain access to the bolts 63, access holes 65 are provided in the first plate member 20. Tubes 67 (FIG. 3) formed of schedule 40 PVC pipe are provided in alignment with the holes 65 to substantially extend between the first and second members 20, 22 to prevent the ingress of polymer concrete into the space needed to access the bolts 63 when the polymer concrete has been poured and cured. The use of PVC pipe reduces any vibration transfer and the tubes 67 do not extend completely between the first and second plate members 28, 30 so that any vibration path is broken. The carriage assemblies 62 operatively engage rails 69 (FIG. 1) for vertical movement of the spindle 14 and structure 12 with a ball nut drive system 66 of conventional design.

Figure 7:
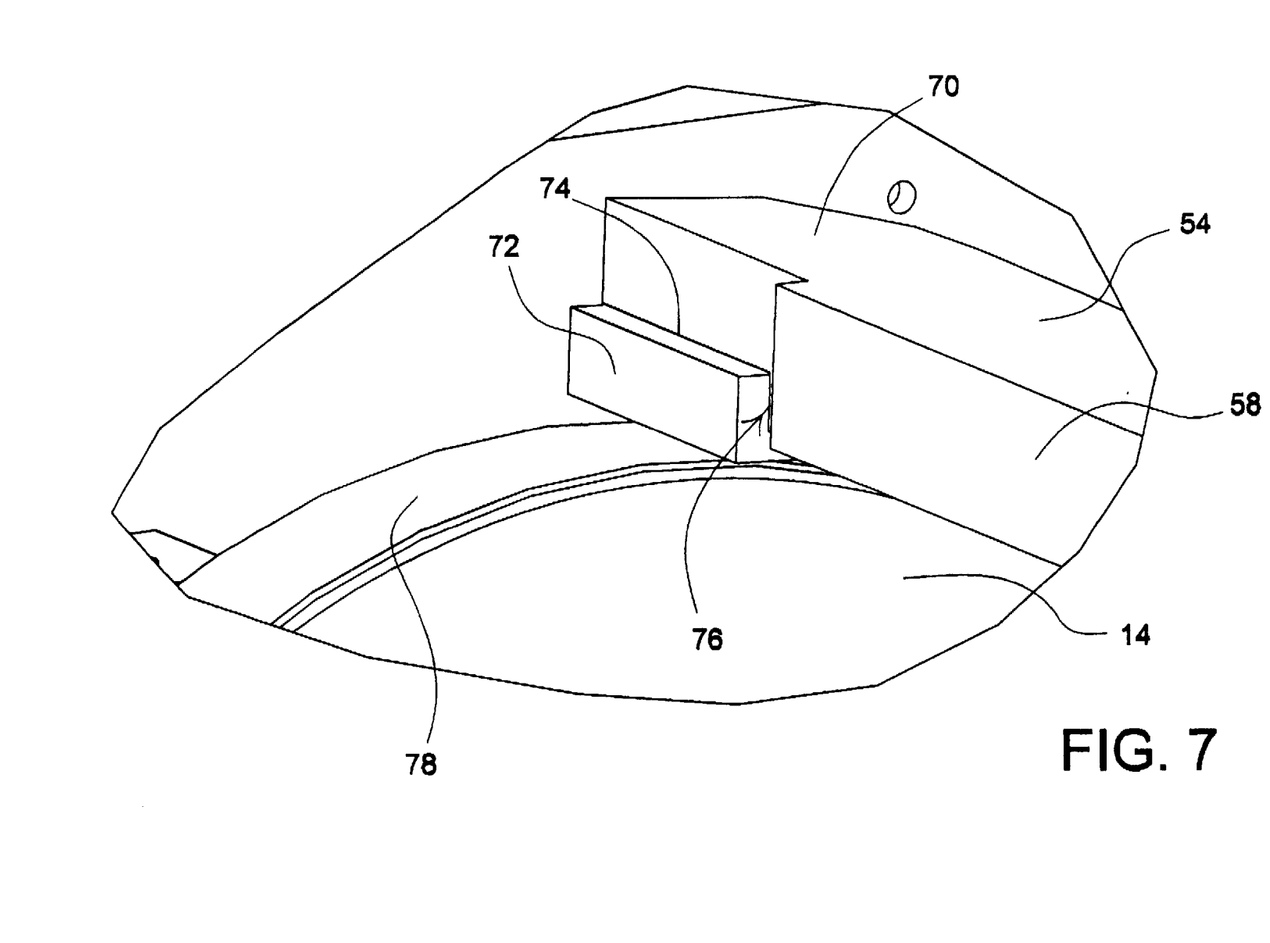
FIG. 7 is an enlarged partially sectional view of an outer end portion of the spindle housing.

The spindle housing 54 has a damping structure 68 for engaging the spindle 14 and reducing vibration therebetween. An outer end portion 70 of the spindle housing 54 has an annular member 72 formed of a damping material or polymer extending around an interior surface 74 of the annular wall 58 within a channel 76 of the spindle housing 54, as best shown in FIG. 7. Preferably, the annular member 72 is formed of a castable polymer produced by ITW Philadelphia Resins of Montgomeryville, Pa. under the trademark SUPER ALLOY ORANGE 750.

The annular member 72 is engagable in confronting relationship with a rear cylindrical portion 78 of the spindle 14. The annular member 72 extends outwardly from the interior surface 74 so that the annular wall 58 does not engage the spindle 14. Hence, the only portions of the structure 12 that engage the spindle 14 are between the mating surface 48 and first plate member 20, and between the annular member 72 and the rear cylindrical portion 78 of the spindle 14 with no metal to metal contact between the first and second plate members 20, 22.

Figure 8:
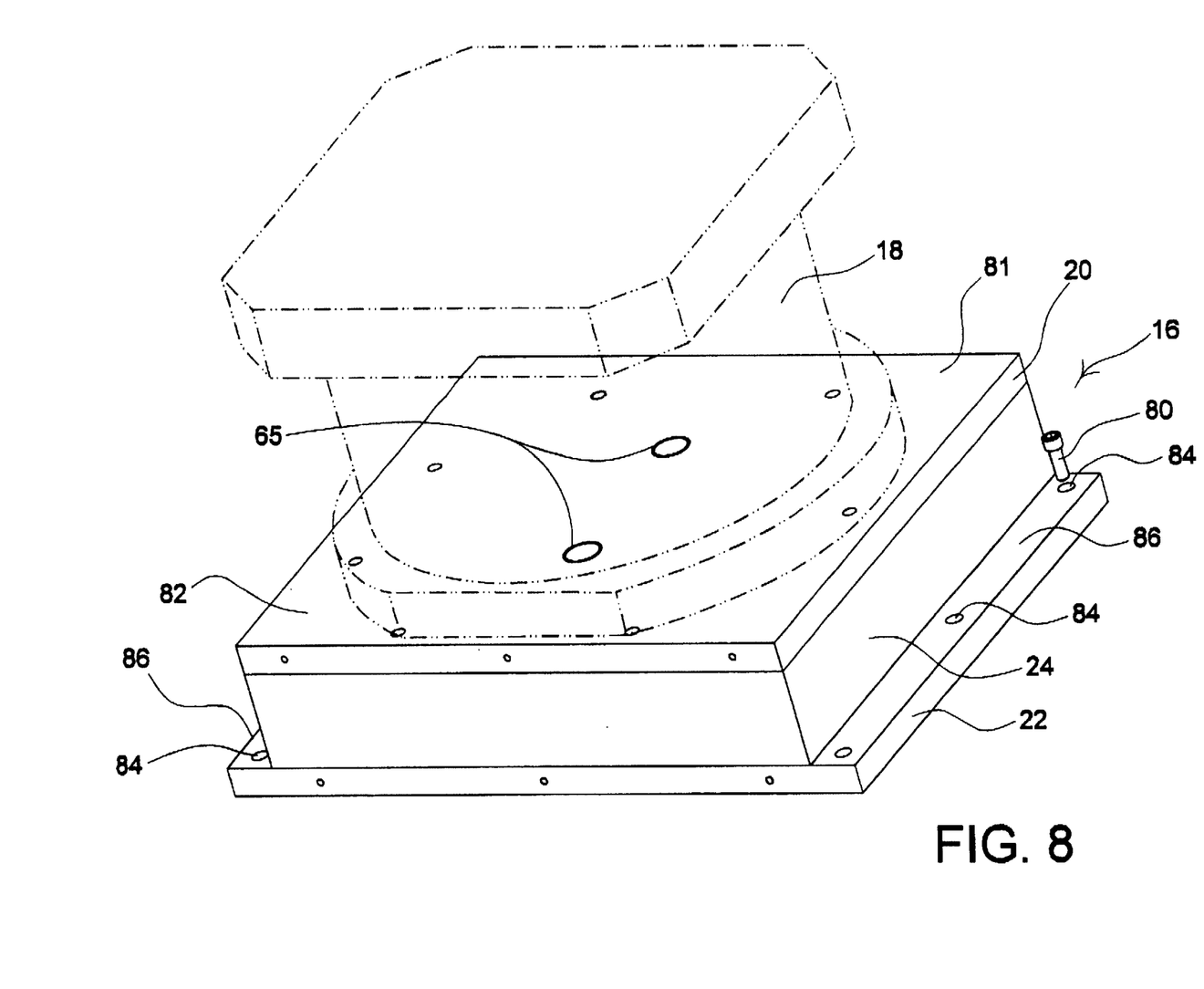
FIG. 8 is a perspective view of a second embodiment of the present invention for use with a rotary table of the machine tool.

Referring now more particularly to the structure 16 of the second embodiment shown in FIGS. 8–10, the structure 16 is mounted to the machine tool 10 with bolts 80 extending through bolt holes 84 of outwardly extending flanges 86 of the second plate member 22. An outer surface 81 of the first plate member 20 extends in a generally horizontal plane 82. Access holes 65 and tubes 67 may also be used for mounting purposes as previously described. The outer surface 81 is sized and configured for mounting the rotary table 18 of the machine tool 10 thereupon.

When utilizing the structures 12, 16 in a machine tool 10, the two structures 12, 16 can also work in concert with one another, breaking the vibration path that is generated in a circular motion traveling from the tool, through the spindle 14 and rotary table 18 and into the main machine members of the machine tool 10 forming a vibration loop, which tends to amplify as it rotates through the machine tool 10.

Although the invention has been described by reference to some embodiments it is not intended that the novel device be limited thereby, but that modifications thereof are intended to be included as falling within the broad scope and spirit of the foregoing disclosure, the following claims and the appended drawings.

We claim:

1. A vibration damping structure for a machine tool, comprising:
   (a) first and second plate members disposed in an opposing spaced apart relationship with one another;
   (b) a cast structure formed of polymer concrete extending between the first and second plate members in confronting engagement with opposed surfaces of the first and second plate members;
   (c) a plurality of first structures attached to the first plate member and extending inwardly of the cast structure, each first structure having a compression surface extending in a parallel spaced apart relationship from the surface of the first plate member; and
   (d) a plurality of a second structures attached to the second plate member and extending inwardly of the cast structure, each second structure having a compression surface extending in a parallel spaced apart relationship from the surface of the second plate member and in an opposed spaced apart interlocking relationship with the compression surface of a respective first structure so that tensile forces applied to the first and second plate members will correspondingly produce compression forces between respective opposing compression surfaces and the polymer concrete therebetween.

2. The vibration damping structure of claim 1, wherein the structure has a spindle aperture extending perpendicularly therethrough, the aperture being adapted for receiving a spindle, the spindle having a mating surface attached to the first plate member.

3. The vibration damping structure of claim 2, wherein the structure has a spindle housing attached to the second plate member, the spindle housing having an annular wall to define a chamber sized and configured for receiving the spindle therewithin.

4. The vibration damping structure of claim 3, wherein the spindle housing has damping means for engaging the spindle and reducing vibration therebetween.

5. The vibration damping structure of claim 4, wherein the damping means includes an outer end portion of the spindle housing having an annular member formed of damping material extending around an interior surface of the annular wall, the annular member being engagable in confronting relationship with a rear cylindrical portion of the spindle.

6. The vibration damping structure of claim 1, further comprising means for mounting the structure to the machine tool with an outer surface of the first plate member extending in a generally horizontal plane, the outer surface being sized and configured for mounting a rotary table of the machine tool thereupon.

7. The vibration damping structure of claim 2, wherein the first and second structures are L-shaped angle irons, each L-shaped angle iron having a first member attached perpendicular to the respective surfaces of the first and second plate members, each L-shaped angle iron having a second member extending from the first member in a parallel spaced apart relationship with the respective surfaces of the first and second plate members, each corresponding compression surface of the first and second structures being disposed on a respective second member.

8. A vibration damping structure, comprising:
   (a) first and second plate members disposed in an opposing spaced apart relationship with one another;
   (b) a cast structure formed of castable damping material extending between the first and second plate members in confronting engagement with opposed surfaces of the first and second plate members; and
   (c) means for transferring tensile forces applied to the cast structure from the first and second plate members into compression forces applied to the cast structure, the transferring means having a first structure attached to the first plate member and extending inwardly of the cast structure, the first structure having a compression surface extending laterally in a spaced apart relationship from the surface of the first plate member, the transferring means having a second structure attached to the second plate member and extending inwardly of the cast structure, the second structure having a compression surface extending laterally in a spaced apart relationship from the surface of the second plate member and in an opposed spaced apart interlocking relationship with the compression surface of the first structure.

9. The vibration damping structure of claim 8, wherein the castable damping material is comprised of a polymer concrete.

10. The vibration damping structure of claim 8, wherein the structure has a spindle aperture extending perpendicularly therethough, the aperture being adapted for receiving a spindle, the spindle having a mating surface attached to the first plate member.

11. The vibration damping structure of claim 10, wherein the structure has a spindle housing attached to the second plate member, the spindle housing having an annular wall to define a chamber sized and configured for receiving the spindle therewithin.

12. The vibration damping structure of claim 11, wherein the spindle housing has damping means for engaging the spindle and reducing vibration therebetween.

13. The vibration damping structure of claim 12, wherein the damping means includes an outer end portion of the spindle housing having an annular member formed of damping material extending around an interior surface of the annular wall, the annular member being engagable in confronting relationship with a rear cylindrical portion of the spindle.

14. The vibration damping structure of claim 9, wherein the first and second structures are L-shaped angle irons, each L-shaped angle iron having a first member attached perpendicular to the respective surfaces of the first and second plate members, each L-shaped angle iron having a second member extending from the first member in a parallel spaced apart relationship with the respective surfaces of the first and second plate members, each corresponding compression surface of the first and second structures being disposed on a respective second member.

15. The vibration damping structure of claim 14, wherein the a plurality of first and second structures are attached to respective first and second plate members with first members of each first and second structure extending substantially parallel to one another, the first and second structures being oriented in the polymer concrete but at all the time remaining separated from one another to prevent the transfer of vibration.

16. The vibration damping structure of claim 9, further comprising means for mounting the structure to the machine tool with an outer surface of the first plate member extending in a generally horizontal plane, the outer surface being sized and configured for mounting a rotary table of the machine tool thereupon.

17. The vibration damping structure of claim 9, wherein the castable polymer concrete is comprised of SUPER ALLOY HI-TECH POLYMER CONCRETE.

18. A vibration damping structure for a spindle of a machine tool, comprising: first and second plate members disposed in an opposing spaced apart relationship with one another, a cast structure formed of castable damping material extending between the first and second plate members in confronting engagement with opposed surfaces of the first and second plate members, the cast structure and first and second plate members having a spindle aperture extending perpendicularly therethough, the aperture being adapted for receiving a spindle, the spindle having a mating surface attachable to the first plate member, a spindle housing attached to and extending rearwardly from a back side of the second plate member, the spindle housing having an annular wall to define a chamber sized and configured for receiving the spindle therewithin, and means for transferring tensile forces applied to the cast structure from the first and second plate members into compression forces applied to the cast structure, the transferring means having a first structure attached to the first plate member and extending inwardly of the cast structure, the first structure having a compression surface extending in a spaced apart relationship from the surface of the first plate member, the transferring means having a second structure attached to the second plate member and extending inwardly of the cast structure, the second structure having a compression surface extending in a spaced apart relationship from the surface of the second plate member and in an opposed spaced apart relationship with the compression surface of the first structure.

19. The vibration damping structure of claim 18, wherein the spindle housing has damping means for engaging the spindle and reducing vibration therebetween.

20. The vibration damping structure of claim 19, wherein the damping means includes an outer end portion of the spindle housing having an annular member formed of damping material extending around an interior surface of the annular wall, the annular member being engagable in confronting relationship with a rear cylindrical portion of the spindle.

21. The vibration damping structure of claim 20, wherein the damping material of the annular member is comprised of a castable polymer and the castable damping material is formed of polymer concrete.

22. The vibration damping structure of claim 20, wherein the first and second structures are L-shaped angle irons, each L-shaped angle iron having a first member attached perpendicular to the respective surfaces of the first and second plate members, each L-shaped angle iron having a second member extending from the first member in a parallel spaced apart relationship with the respective surfaces of the first and second plate members, each corresponding compression surface of the first and second structures being disposed on a respective second member.

23. The vibration damping structure of claim 22, wherein the a plurality of first and second structures are attached to respective first and second plate members with first members of each first and second structure extending substantially parallel to one another.

24. The vibration damping structure of claim 23, wherein the first and second structures being oriented within the polymer concrete but at all the time remaining separated from one another to prevent the transfer of vibration.

25. A vibration damping structure, comprising:

(a) first and second plate members disposed in an opposing spaced apart relationship with one another;

(b) a cast structure formed of castable damping material comprised of polymer concrete extending between the first and second plate members in confronting engagement with opposed surfaces of the first and second plate members; and (c) means for transferring tensile forces applied to the cast structure from the first and second plate members into compression forces applied to the cast structure, the transferring means having a first structure attached to the first plate member and extending inwardly of the cast structure, the first structure having a compression surface extending in a spaced apart relationship from the surface of the first plate member, the transferring means having a second structure attached to the second plate member and extending inwardly of the cast structure, the second structure having a compression surface extending in a spaced apart relationship from the surface of the second plate member and in an opposed spaced apart relationship with the compression surface of the first structure.

26. A vibration damping structure, comprising:

(a) first and second plate members disposed in an opposing spaced apart relationship with one another;

(b) a cast structure formed of castable damping material extending between the first and second plate members in confronting engagement with opposed surfaces of the first and second plate members, the structure having a spindle aperture extending perpendicularly therethrough, the aperture being adapted for receiving a spindle, the spindle having a mating surface attached to the first plate member; and (c) means for transferring tensile forces applied to the cast structure from the first and second plate members into compression forces applied to the cast structure, the transferring means having a first structure attached to the first plate member and extending inwardly of the cast structure, the first structure having a compression surface extending in a spaced apart relationship from the surface of the first plate member, the transferring means having a second structure attached to the second plate member and extending inwardly of the cast structure, the second structure having a compression surface extending in a spaced apart relationship from the surface of the second plate member and in an opposed spaced apart relationship with the compression surface of the first structure.

* * * * *